United States Patent [19]
Andrews

[11] 3,973,265
[45] Aug. 3, 1976

[54] TEMPERATURE RECORDING INSTRUMENT

[75] Inventor: Richard A. Andrews, Dearborn, Mich.

[73] Assignee: H. O. Trerice Co., Oak Park, Mich.

[22] Filed: May 1, 1975

[21] Appl. No.: 573,686

[52] U.S. Cl. .......................... 346/139 R; 73/343.5; 346/72; 346/123
[51] Int. Cl.² ........................................ G01D 15/24
[58] Field of Search ............ 346/139 R, 139 C, 137, 346/123, 121, 124, 72; 73/343.5

[56] References Cited
UNITED STATES PATENTS
| | | | |
|---|---|---|---|
| 1,925,515 | 9/1933 | Beck | 346/139 C X |
| 2,500,657 | 3/1950 | Bowditch | 346/139 C X |

*Primary Examiner*—Joseph W. Hartary
*Attorney, Agent, or Firm*—Cullen, Settle, Sloman & Cantor

[57] ABSTRACT

The temperature recording instrument contains the usual thermal measuring system consisting of a bellows assembly, a temperature sensitive bulb and capillary tubing between the bellows and bulb and a recording system including a marking element which is responsive to the energization of the bellows for permanently indicating the temperature sensed by the bulb on chart paper mounted on a base plate located in the instrument housing. A fulcrum having an axis extends through the base plate and carries a bracket which is provided with one slot or with a pair of slots on opposite sides of the axis. A spool is located in one or the other of the slots. An adjusting screw is carried by the bracket and is threadedly connected to the spool. Rotation of the adjusting screw is effective to move the spool in the corresponding slot relative to the fulcrum's axis. The marking element is located on the chart side of the base plate and is secured to the bracket. The bellows includes a movable element engageable with the spool. Energization of the bellows is effective to move the movable element which engages the spool and rotate the bracket about the fulcrum resulting in the movement of the marking element in one direction across the chart. If a second slot is provided in the bracket, the spool may be located therein, with the movable element of the bellows engaging same to effect rotation of the bracket and the movement of the marking element in the opposite direction across the chart.

18 Claims, 8 Drawing Figures

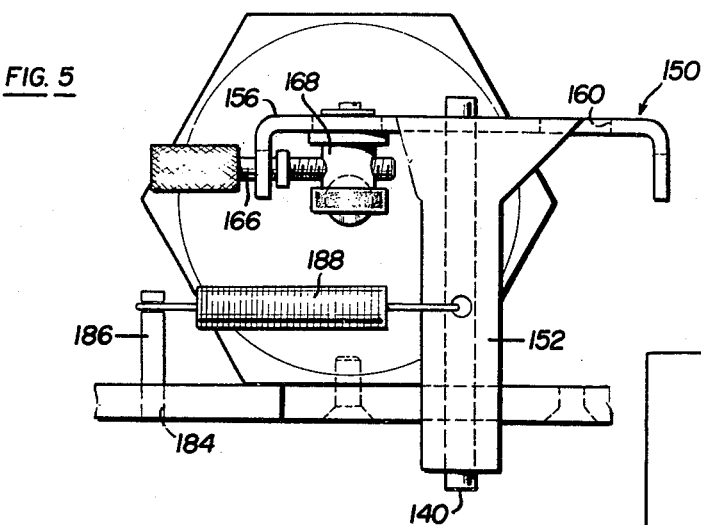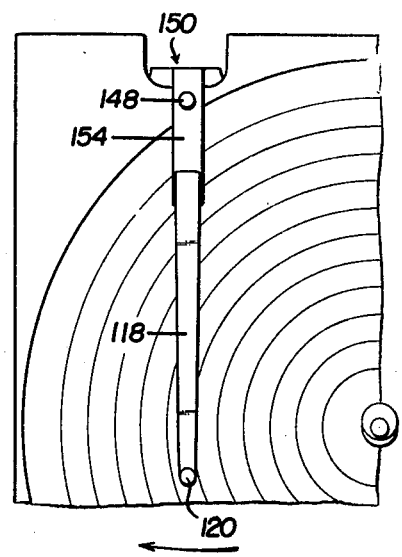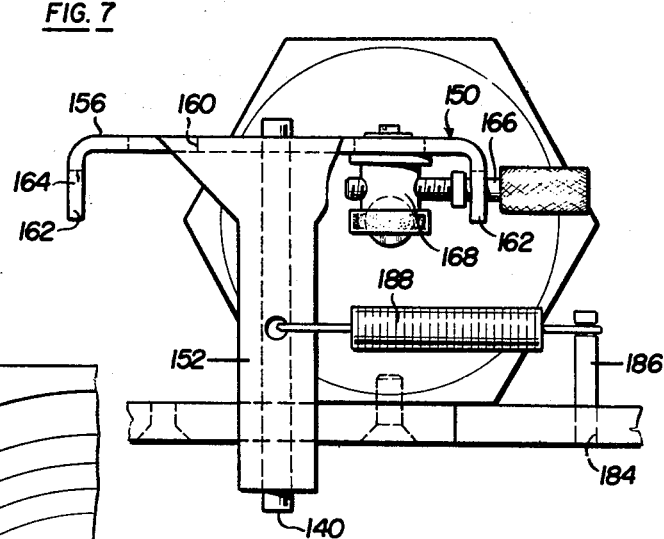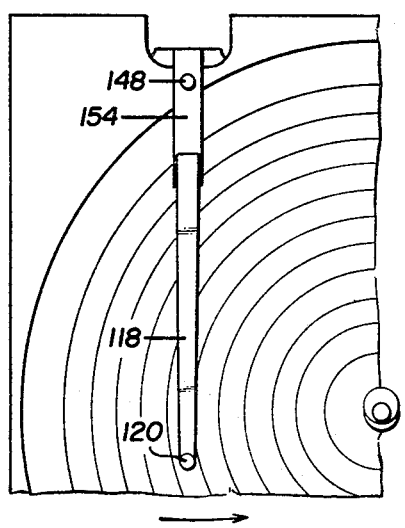

TEMPERATURE RECORDING INSTRUMENT

BACKGROUND OF THE INVENTION

1. Field of the Invention

The temperature recording instrument of the present invention is designed to record the temperature of hot water heaters, plating baths, ovens, mixers, refrigeration units, chicken cookers, and may be used in many other industrial and domestic applications. As an examples the instrument may be used for measuring the temperature of milk located in a bulk milk cooler on a dairy farm.

2. Description of the Prior Art

The prior art discloses many different types and forms of temperature recording instruments or recorders. Such instruments employ the conventional thermal measuring system disclosed herein which consists of a bellows assembly, a temperature sensitive bulb and capillary tubing between the bellows and bulb. The prior art also discloses mechanisms or movement assemblies interposed between the bellows assembly and the marking pen for moving the pen across a chart located in the instrument housing. However such movement assemblies are rather complicated thus making the instrument difficult to assemble and disassemble and difficult to maintain.

SUMMARY OF THE INVENTION

It is a feature of the present invention to provide a recording thermometer or temperature recording instrument which is versatile and capable of effecting good recording over a wide range of temperatures.

It is a feature of the present invention to provide a recording thermometer or temperature recording instrument which is versatile and capable of effecting good recording over a wide range of temperatures.

It is a further feature of the present invention to provide a temperature recording instrument of the general type disclosed in the Summary wherein the base plate is provided with a fulcrum and with the bellows having a movable element being adapted to be mounted on the base plate at one or the other side of the axis of the fulcrum, with the movable element of the bellows when located in one or the other of its positions being adapted to engage an actuating screw operated spool by a bracket at the same side of the fulcrum+s axis. In one of the positions, the energization of the bellows will be effective to rotate the bracket and cause the marking element to swing in one direction across the chart paper. when the bellows is located in the other of the positions, the movable element engages the screw operated spool carried by the bracket on the opposite side of the fulcrum's axis so as to rotate the bracket in the opposite direction and cause the marking element to swing in the opposite direction across the chart paper.

Another feature of the present invention is to provide an instrument of the aforementioned type in which the bracket is provided with one slot or with a pair of slots on opposite sides of the axis of the fulcrum, with the spool being adapted to be located in either one or the other of the slots depending on the direction in which the marking element is to move across the chart.

A further feature of the present invention is to provide a temperature recording instrument of the aforementioned type having a housing with a base plate being pivotally mounted therein. The base plate is provided with upper and lower pivot mountings adjacent one edge portion thereof engageable with the housing. The opposite vertical edge portion is provided with a latching element which is adapted to be received in a lock plate secured to the inside of the housing.

A still further feature of the present invention is to provide an improved temperature recording instrument having a high degree of sensitivity and ruggedness which is simple in construction, easy to dissemble for maintenance purposes, and is economical to manufacture.

IN THE DRAWINGS

FIG. 5 is a fragmentary top view taken on the line 5—5 of FIG. 4 and showing the bellows mounted in one position on the base plate;

FIG. 6 is a fragmentary front elevational view of the marking instrument and chart paper; showing the marking element moving outwardly on the chart paper;

FIG. 7 is a view similar to FIGS. 5, with the spool, adjusting screw, bellows on spring moved to the opposite side of the fulcrum's axis; and FIG. 8 is a view similar to FIG. 6, but showing the marking instrument as moving inwardly on the chart paper as a result of the change of the location of the spool, adjusting screw, bellows and spring as illustrated in FIG. 7.

DESCRIPTION OF THE PREFERRED EMBODIMENT

Figure 1:
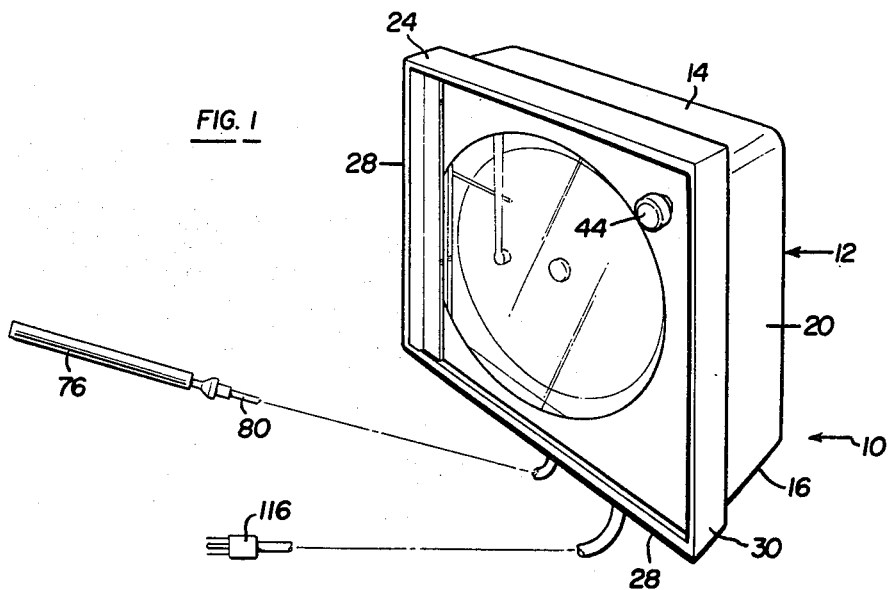
FIG. 1 is a perspective view of the temperature recording instrument of the present invention.

The temperature recording instrument or recorder is designated by the numeral 10 and includes a housing or case 12 of generally rectangular configuration as illustrated in the drawings. The housing 12 includes front and rear zones or sections, with the rear section including a top wall 14, bottom wall 16, a pair of vertical side walls 18 and 20 and a rear wall or panel 22. The front section of housing 12 provides a continuous or annular rim for the housing 12 and is larger in height and width than the rear section. The front section 12 includes a top wall 24, a bottom wall 26 and a pair of vertical side walls 28 and 30. The several top, bottom and side walls of housing 12 are connected by an annular or continuous rim 32 which has an annular continuous interior surface 34 on which is appropriately mounted a suitable gasket 36 made, as an example, from neoprene or other suitable sealing material.

The housing 12 is provided with a door or cover assembly 40 having a transparent window 42 therein for viewing the interior of the instrument 10. The cover assembly 40 is provided on the inner vertical edge thereof with upper and lower pivot or hinge mountings or pins, not shown, which are respectively rotatably retained in the top and bottom walls 24 and 29 respectively. The coverassembly 40 when closed, is received within the front section of the housing 12 and is sealed by the gasket 36 to prevent contamination of the instrument by environmental dust and dirt. The outer vertical edge of the door 40 is provided with a knurled fastener 44 adapted to extend through an opening 46 FIG. 3) and engage a locking element 48 carried on the base side of the base plate 50 (FIG. 3) in the usual manner.

Figure 2:
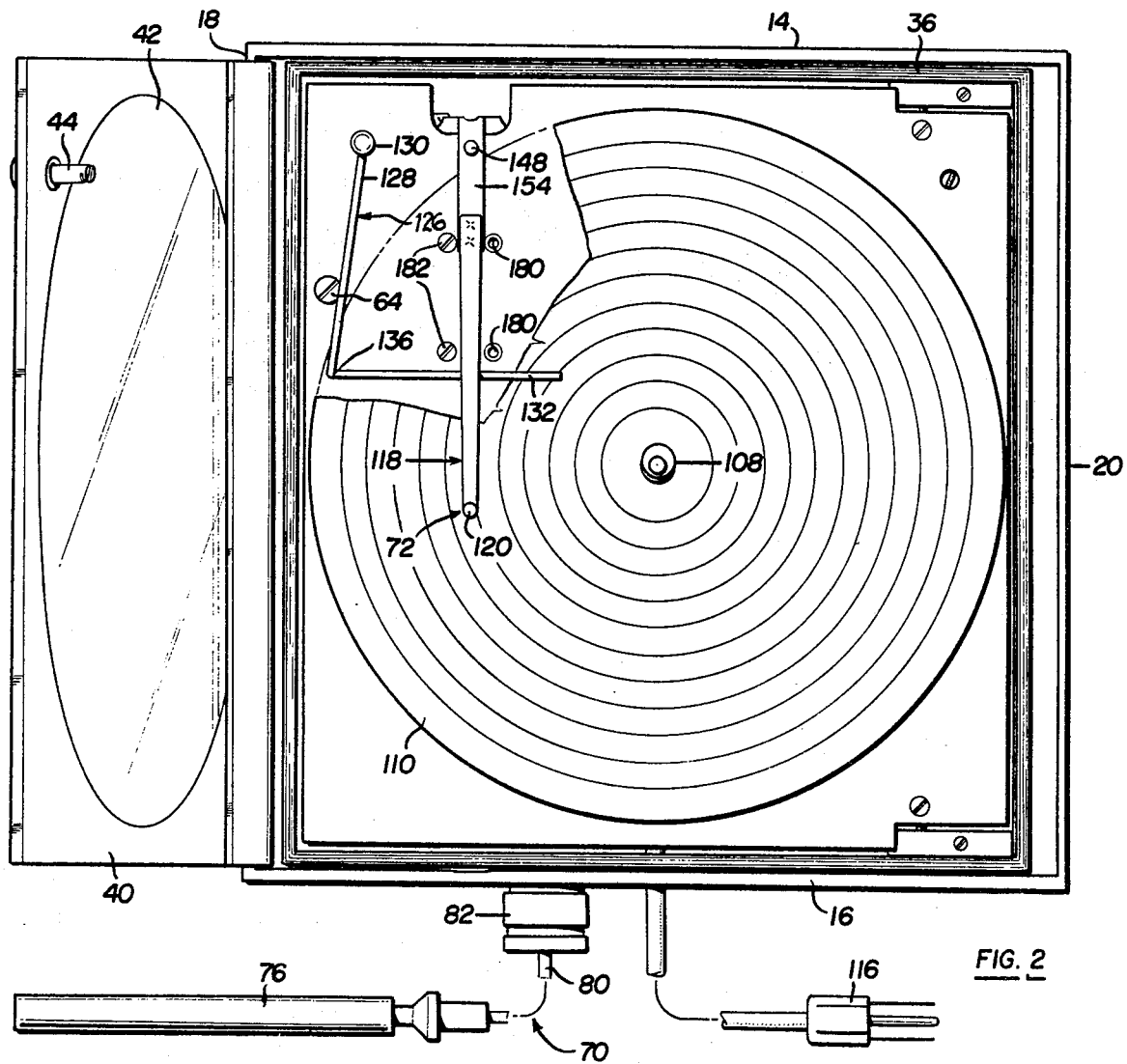
FIG. 2 is a front elevational view of the instrument illustrated in FIG. 1, with the door or cover in an open position to expose the interior of the housing.
Figures 3, 4:
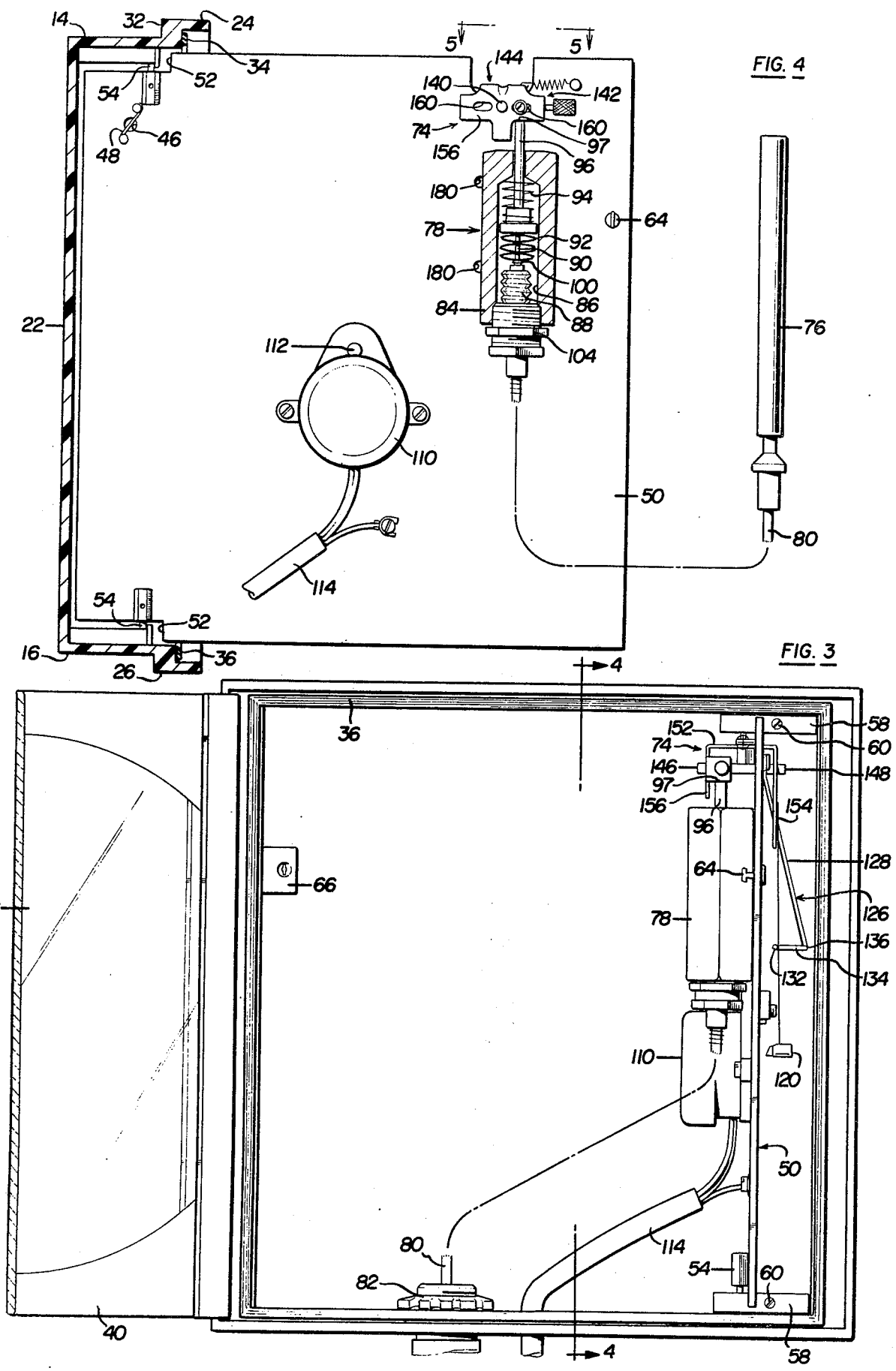
FIG. 3 is a front elevational view similar to FIG. 2 with the exception that the pivotally mounted base plate is rotated 90° in order to illustrate the component parts of the instrument mounted on the base plate.
FIG. 4 is a sectional view taken on the line 4—4 of FIG. 3, with the bellows being in sections.

The base plate 50 is of generally rectangular configuration and is adapted to be mounted in the rear section of the housing 12. The base plate 50 along one vertical edge portion is provided with upper and lower notched out areas 52. Upper and lower mounting or hinge pins 54 are secured to the base plate 50 adjacent the notched out areas 52. The mounting pins 54 are rotatably carried by ribs, not shown, provided in the top and bottom walls 14 and 16 of housing 12. Retainer plates 58 are secured to the housing 12 and are secured to the housing ribs by screws 60. The retainer plates 58 extend along and abut the top and bottom walls 14 and 16 as shown in FIG. 3. The retainer plates 58 cooperate with the notched out areas 52 of the base plate 50 and provide support for the base plate 50 when in a normal position as viewed in FIG. 2. The base plate 50 further includes a latching element 64 which is adapted to engage with a keeper part 66 secured to the side wall 18 of the housing 12 for latching the base plate 50 in the rear zone of housing 12.

The instrument 10 includes a temperature responsive system 70; a marking system 72; and a movement assembly 74. The temperature responsive system 70 comprises a temperature sensitive or sensing bulb or probe 76, located exteriorly of the housing 12, an actuator or bellows assembly 78 mounted on the base plate 50, and a length of capillary tubing 80. The bottom wall 16 is provided with an opening which carries a conventional conduit connector assembly 82 through which the tubing 80 extends between the bellows assembly 78 and bulb 76.

The bellows or actuator assembly 78, shown in FIG. 4, includes a housing 84 having a cavity 86 in which is located a bellows 88, a guide pin 90 extending through a series of compensator discs 92, a spring 94 and an actuating pin assembly or movable element 96. A ball connection 100 is provided between the opposing ends of the bellows 88 and the guide pin 90 which is connected on the other end thereof to the actuating pin assembly 96. The pin assembly 96 has a flat and smooth surface 97. The compensator discs 92 are stacked in pairs, with the high expansion sides thereof together as is well known in the art. The tubing 80 enters the bellows housing 84 at the bottom thereof. This is accomplished by means of an adjusting screw 104 which is screw threaded into the housing 84 beneath the bellows 88 (FIG. 4).

The base plate 50 is provided with a generally centrally located opening which has therein a conventional releasable latching assembly or means 108 for mounting and holding a chart or paper disc 110 on the front side of the plate 50 opposite the cover assembly 40. The assembly 108 includes a shaft portion, not shown, for engagement with the electrical chart drive motor assembly 110 mounted on the rear side of the base plate 50 by suitable fasteners 112. A power supply cord 114 is connected on the inner end to chart motor assembly 110 and extends through an opening provided in bottom wall 16 to the exterior of housing 12 where it is provided with a three prong plug 116.

The marking system 72 includes the replaceable chart or disc 110, a pen arm assembly 118, and a marking element or ink pen 120 provided on the end of assembly 118 which is free. The chart 110, as an example, is 10 inches in diameter and is provided with uniform temperature graduations, which are accurate and capable to record temperatures, as an example, from −150° to 700° F. or centigrade equivalent at the sensing bulb 76. The transparent window 42 permits the entire chart 110 to be viewed at a glance. A spring 126 includes an inclined base portion 128, fixed on one end to the base plate 50 by a fastener 130, an outer arm portion 132 and a connecting portion 134 joining portions 128 and 132. The arm portion 132 engages the pen arm assembly 118 and biases assembly 118 in a direction to move the pen 120 away from the chart 110. Thus the spring 126 forms an automatic pen lifting device for raising the pen 120 from the chart 110 when the cover assembly 40 is opened. When the door assembly 40 is closed, it engages the spring 126 at area 136 (FIG. 3) to move the spring 126 inwardly thereby permitting the pen 120 to engage the chart 110.

The movement assembly 74 is interposed between the temperature responsive system 70 and the marking system 72. Movement assembly 74 includes a stationary mounting element or fulcrum 140 and a bracket assembly 142 interposed between bellows rod or element 96 and the pen arm assembly 118.

The base plate 50 is provided with a notched area 144 at the upper edge portion thereof. The fulcum 140 extends through an opening provided in base plate 50 adjacent area 144 so as to provide a pair of non-rotatable generally cyclindrical bearing areas or surfaces 146, 148, on bearing area or surface on each side of the plate 150.

The bracket assembly 142 includes a bracket 150 having a bridge portion 152 extending across the base plate 50 through the notched area 144, with an arm portion 154 securd to one end of the bridge portion 152 and a flange portion 156 secured to the other end of the bridge portion 152. The bridge portion is spaced above the axis of the fulcrum or mounting element 140. Arm portion 154 is provided with an opening for receiving the cylindrical bearing portion or area 148 of fulcrum 140. The arm portion 154 is secured to the pen arm assembly 118 by suitable fastening means. Flange portion 156 is provided with an opening for receiving the cylindrical bearing portion or area 146 of fulcrum 140. Thus the bracket 150 is mounted for rotation on fulcrum 140 at two axially spaced points, one point on each side of the base plate 50.

The flange portion 156 of bracket 150 is provided with a pair of slots 160, one slot on each side of the axis of fulcrum 140. The slots 160 are elongated and have the same axis which intersects and is perpendicular to the axis of the fulcrum 140 as best illustrated in FIG. 4.

The ends of the flange portion 156 are bent and turned toward the base plate 50 to provide a pair of generally parallel ears 162. Each ear 162 has an open ended slot 164 adapted to receive a threaded adjusting screw 166. A non-rotatable spool 168 is located in one or the other of the slots 160 and is threadedly connected to the adjusting screw 166 provided in the corresponding ear 162. Rotation of the adjusting screw 166 is effective to move the spool 168 in the slot 160 closer to or away from the axis of the fulcrum 140.

The flat surface 97 on the movable bellows element 96 engages the spool 168 and upon movement of the bellows element 96, rotates the bracket assembly 142 and the pen arm assembly which swings the marking pen across the chart in a direction depending on which side of the fulcrum 140 the bellows assembly 78, spool 168, screw 166 and the other components are located.

The base plate 50 is provided with two sets of openings, each set consisting of a pair of vertical spaced openings 180. One set of openings 180 is located on one side of a vertical plane containing the axis of the fulcrum 140 while the other set of openings 180 is located at the other side thereof. The bellows assembly 78 is attached to the base plate 50 in one of two positions so that the axis of the movable bellows element 96 is at one side or the other of the fulcrum axis. A pair of screws 182 FIG. 2) extends through one set of openings 180 to secure the bellows assembly to base plate 50.

The base plate 50 is also provided with a pair of openings 184, one on each side of the fulcrum 40 receiving a spring anchoring element 186. A coil spring 188 is interposed between the bridge portion 152 of bracket 150 and the anchoring element 186 for biasing the spool 168 against the flat surface 97 of the movable bellows element 96.

When the bellows assembly is mounted on the base plate 50 in the first position shown in FIGS. 4 and 5, or in the second position shown in FIG. 6, the spool 168, actuating screw 166, spring 188 and the spring anchoring element 186 are located on the same side of the fulcrum's axis as the movable element 96.

In FIGS. 4, 5 and 6, upon energization of the bellows assembly 78, the movement assembly 74 rotates in a clockwise direction, as viewed in FIG. 4, thereby causing the pen arm assembly 118 and pen 120 to swing to the outside of the chart upon temperature changes at the bulb 76. In FIGS. 7 and 8, upon energization of the ellows assembly 78, the pen arm assembly 118 and pen 120 swings to the inside of the chart upon temperature changes at the bulb 76.

In operation recording action of the instrument 10 is provided through the well known principle of liquid volume change. With a variation in temperature, the liquid in the sensing bulb 76 expands or contracts, causing the spring loaded bellows 88, to actuate the recording mechanism as described previously. Ambient compensation is provided by the bi-metal compensator discs 94. As temperature increases the bi-metal stick decreases in height at the same rate as the temperature increases the height of the bellows 88, thereby nullifying the action of the bellows 88 caused by the ambient temperature change.

The instrument 10 may be calibrated and recalibrated according to standard practices now in use.

As noted previously, the movable bellows element 96, which has a vertical travel of approximately ¼ inch, , engages the spool 168. The position of the spool 168 in slot 160 relative to the fulcrum 140 accounts for the amount of travel of the pen 120. If the spool 168 is at the end of the slot 160 closest to fulcrum 140, the movement of recording pen 120 will be the greatest. If the spool 168 at ta the end of the slot 160 remote from fulcrum 140, the movement of recording pen will be at a minimum. If the recording pen does not move far enough, the actuating screw 166 is rotated to move the spool 168 closer to the fulcrum 140.

What is claimed is:

1. An instrument for recording temperatures or other information comprising a housing, a plate mounted in said housing, said plate having a pair of sides, one of the sides of said plate being adapted to carry a chart upon which information may be recorded, a non-rotatable mounting element carried by said plate and having an axis extending through said plate, said mounting element extending through the opposite sides of said plates to provide a pair of bearing surfaces, one bearing surface on each side of said plate, a rotatable bracket carried by the bearing surfaces of said mounting element, said bracket including a bridge portion extending across said plate adjacent but spaced from said axis, an arm portion at one end of said bridge portion at said one side of said plate, said arm portion having an opening for receiving one of the bearing surfaces of said mounting element, and a flange portion at the other end of said bridge portion at the other side of said plate, said flange portion including a first part having an opening for receiving the other of the bearing surfaces of said mounting element, said first part of said flange portion including a pair of slots, one slot being located on each side of said last mentioned opening and said axis of said mounting element, said flange portion having a seconnd part including a pari of ears at the ends of said first portion, said ears being generally parallel to said axis, a non-rotatable spool located in either one or the other of said slots, an adjusting screw carried by one of said ears which corresponds to the slot in which said spool is located, said adjusting screw being threadedly secured to said spool and effective upon rotation of said adjusting screw to move said spool in said one slot in a direction generally perpendicular to said axis, a marking element secured to the arm portion of said bracket and adapted to mark the chart, an actuator secured to said plate at said other side thereof, said actuator being secured to said plate in one of two positions which depend on which of said slots and said ears employ said spool and said adjusting screw respectively, said actuator including a movable element having an axis which is generally perpendicular to and spaced from said first mentioned axis, said movable element being located on the same side of said first mentioned axis as said spool and said adjusting screw, said actuator element including an abutment surface engageable with said spool located in one of said slots, said actuator upon energization thereof being effective to move said actuator element and to thereby rotate said bracket resulting in the movement of said marking element across said chart to record information theron.

2. The instrument defined in claim 1 wherein a notch is provided in the upper edge of said plate adjacent one corner thereof, said bridge portion of said bracket extending through said notch.

3. The instrument defined in claim 1 wherein said plate is provided with two sets of mounting openings, one set of openings being employed to mount said actuator in one of said positions and the other set of openings being employed to mount the actuator in the other of said positions, said actuator being attached to said plate in one or the other of said positions by fastening elements extending through the corresponding mounting openings in said plate and into said actuator.

4. The instrument defined in claim 1 wherein said actuator is in the form of a bellows, said bellows forming part of a thermal measuring system including a temperature sensitive bulb and capillary tubing interposed between said bellows and said bulb.

5. The instrument defined in claim 1 wherein resilient means is interposed between said bracket and said plate for biasing said bracket in a direction to urge said spool against the abutment surface on said actuator element.

6. The instrument defined in claim 4 wherein an anchoring element is located on the other side of said plate and on the same side of said first mentioned axis as said actuator element, said resilient means being in the form of a spring connected on one end to said bridge portion of said bracket and on the other end to said anchoring element.

7. The instrument defined in claim 4 wherein said plate is provided with a pair of openings for said anchoring element, one opening on each side of the axis of said mounting element, said anchoring element being located in one or the other of said last mentioned openings depending on the position of said actuator.

8. The instrument defined in claim 1 wherein said plate is pivotally mounted in said housing about one vertical edge portion thereof and including upper and lower pivot mountings, the other vertical edge portion of said plate being provided with a latching element engageable with a lock plate carried by said housing, said upper and lower pivot mountings and the engagement of said latching element with said lock plate providing a three point mounting of said plate in said housing.

9. The instrument defined in claim 1 wherein said housing is provided with a cover which is pivotally mounted to the remaining portion of said housing, said cover including a window which, when the cover is closed, permits the chart and marking element to be viewed from the exterior of the instrument.

10. The instrument defined in claim 1 wherein said one side of said plate is provided with releasable locking means for holding a chart, said locking means including a shaft portion at said other side of said plate, and a drive motor for rotating said shaft portions and in turn rotating said locking means and the chart.

11. A recording instrument comprising a housing, a plate mounted in said housing, said plate having a pair of sides, one of the sides of said plate being adapted to carry a chart upon which information may be recorded, a fulcrum carried by said plate and having an axis extending through said plate, said fulcrum extending through the opposite sides of said plates to provide a pair of bearing surfaces, one bearing surface on each side of said plate, a bracket carried by the bearing surfaces of said fulcrum, said bracket including a bridge portion extending across said plate adjacent but spaced from said axis, an arm portion at one end of said bridge portion at said one side of said plate, said arm portion having an opening for receiving one of the bearing surfaces, and a flange portion at the other end of said bridge portion at the other side of said plate, said flange portion having an opening for receiving the other of the bearing surfaces, said flange portion including a slot at one side of the axis of said fulcrum and having an ear at one end thereof which is spaced from said axis, a spool located in said slot, an adjusting screw carried by said ear, said adjusting screw being threadedly secured to said spool and effective upon rotation of said adjusting screw to move said spool in said slot relative to said axis, a marking element secured to the arm portion of said bracket and adapted to mark the chart, an actuator secured to said plate at said other side thereof, said actuator including a movable element having an axis which is generally perpendicular to and spaced form said first mentioned axis, said movable element being located one the same side of said first mentioned axis as said spool, said actuator element including an abutment surface engageable with said spool, said actuator upon energization thereof being effective to move said actuator element which engages said spool and rotate said bracket about said fulcrum resulting in the movement of said marking element in one direction across said chart.

12. The recording instrument defined in claim 11 wherein said bracket includes a second slot on the other side of said axis, said spool being adapted to be positioned in said second slot, with said movable element in engagement therewith, whereby said actuator upon energization thereof being effective to move said actuator element and rotate said bracket about said fulcrum resulting in the movement of said marking element in the opposite direction across said chart.

13. The recording instrument defined in claim 11 wherein resilient means is interposed between said bracket and said plate for biasing said bracket in a direction to urge said spool against said movable element of said actuator.

14. The recording instrument defined in claim 13 wherein an anchoring element is located on the other side of said plate and on the same side of said axis as said spool, said resilient means being in the form of a spring connected at one end to said bracket and on the other end to said anchoring element.

15. A recording instrument comprising a housing, a plate mounted in said housing, said plate having a pair of sides, one of the sides of said plate being adapted to carry a chart upon which information may be recorded, a fulcrum carried by said plate and having an axis extending through said plate, a bracket carried by said fulcrum, said bracket including a slot at one side of the axis of said fulcrum, a spool located in said slot, an adjusting screw carried by said bracket, said adjusting screw being threadedly secured to said spool and effective upon rotation thereof to move said spool in said slot relative to said axis, a marking element at said one side of said plate secured to said bracket and adapted to mark the chart, and an actuator secured to said plate at said other side thereof, said actuator including a movable element engageable with said spool, said actuator upon energization thereof being effective to move said actuator element which engages said spool and rotate said bracket about said fulcrum resulting in the movement of said marking element in one direction across said chart.

16. The recording instrument defined in claim 15 wherein said bracket includes a second slot on the other side of said axis, said spool being adapted to be positioned in said second slot, with said movable element in engagement therewith, whereby said actuator upon energization thereof being effective to move said actuator element and rotate said bracket about said fulcrum resulting in the movement of said marking element in the opposite direction across said chart.

17. The recording instrument defined in claim 15 wherein resilient means is interposed between said bracket and said plate for biasing said bracket in a direction to urge said spool against said movable element of said actuator.

18. The recording instrument defined in claim 17 wherein an anchoring element is located on the other side of said plate and on the same side of said axis as said spool, said resilient means being in the form of a spring connected at one end to said bracket and on the other end to said anchoring element.

\* \* \* \* \*